United States Patent
Chadwick

[15] 3,695,555
[45] Oct. 3, 1972

[54] GUN-LAUNCHED GLIDE VEHICLE WITH A MID-COURSE AND TERMINAL GUIDANCE CONTROL SYSTEM

[72] Inventor: William R. Chadwick, Dukinfield, England

[73] Assignee: The United States of America as represented by the Secretary of the Navy

[22] Filed: June 12, 1970

[21] Appl. No.: 45,736

[52] U.S. Cl.................................244/3.14, 244/3.16
[51] Int. Cl. ...........F41g 7/14, F41g 7/06, F11g 9/00
[58] Field of Search.....................244/3.14, 3.27, 3.28

[56] References Cited

UNITED STATES PATENTS

| | | | |
|---|---|---|---|
| 3,374,967 | 3/1968 | Plumley | 244/3.14 |
| 2,959,143 | 11/1960 | Endrezze | 244/3.27 |
| 3,274,552 | 9/1966 | Harmon et al. | 244/3.14 X |
| 3,360,214 | 12/1967 | Stoherbatcheff | 244/3.14 |
| 3,363,858 | 1/1968 | Dobbins et al | 244/3.14 |
| 3,168,264 | 2/1965 | Sendles | 244/3.14 |

*Primary Examiner*—Benjamin A. Borchelt
*Assistant Examiner*—Thomas H. Webb
*Attorney*—R. S. Sciascia and Thomas O. Watson, Jr.

[57] ABSTRACT

The system comprises an eight-inch full-bore glide vehicle having retractable aerodynamic lifting surfaces which increase range performance and accuracy. The glide vehicle can be fired to a maximum range of 135 miles without guidance or to a range of 100 miles with accurate terminal guidance. An infrared horizon scanner provides feedback information to small bang-bang servo-operated roll-tabs for vehicle despin and roll-attitude stabilization. Target acquisition occurs from the glide path with ship-based radar providing information for mid-course lateral guidance control. A forward observer illuminates the target with laser energy and the vehicle homes in on the target using bang-bang monoplane control.

9 Claims, 5 Drawing Figures

GUN-LAUNCHED GLIDE VEHICLE WITH A MID-COURSE AND TERMINAL GUIDANCE CONTROL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in weapon systems, and more particularly it pertains to a guidance control system for guiding a missile toward a target.

One of the most critical problems confronting developers of weapon systems is increasing the range performance and accuracy of the weapons. This invention increases the range of a modified 8-inch gun-launched vehicle from 20 miles to about 100 miles with terminal homing accuracy.

Increased range may be achieved in various ways, such as increasing the muzzle velocity through sub-caliber design or by rocket assistance. An alternate approach is a full-bore glide vehicle with retractable aerodynamic lifting surfaces as used in the present invention. There are several important advantages to this approach: first, the glide vehicle can fly further with increased payload; second, the large wing surfaces may be used to considerable advantage for control and guidance; and finally, of course, there are no rocket motor stowage, stability and ignition problems. The main disadvantage with the glide vehicle approach is that it requires mid-course command guidance.

Most guided weapons require rate-feedback control systems for stabilizing missile angular motions. An important feature of the present invention is that the glide vehicle possesses considerable inherent dynamic stability. For this reason, pitching and rolling motions are highly stable which eliminates the need for autopilot assistance. This is of importance in the present system where, if an auto-pilot were needed, it would be required to survive large peak acceleration levels at launch and such an auto-pilot has not been developed in the prior art.

SUMMARY OF THE INVENTION

The general purpose of this invention is to provide a weapon system having increased range performance and accuracy. An 8-inch full-bore glide vehicle weighing 250 pounds and having retractable aerodynamic lifting surfaces can be fired without guidance to a maximum impact range of 135 miles. With mid-course guidance and terminal homing, target engagements at ranges up to 100 miles are possible.

An infrared horizon scanner provides feedback information to small roll-tabs which operate in a bang-bang mode for pre-vertex despin and roll-attitude stabilization. The gliding flight phase commences with the application of a constant (nose-plane) cruise trim setting at the vertex. During the cruise phase, the directional motion of the vehicle is controlled by banking to the left or right in accordance with radar tracking data. However, since target acquisition is possible even with lateral location errors exceeding 3 miles, an extremely accurate azimuth track is not necessary and range tracking is not required at all.

A forward observer illuminates the target with a laser beam and the end-of-cruise phase occurs following the acquisition of the laser energy. The roll-tabs are then allowed to trail and the glide vehicle, rolling freely under the influence of small roll asymmetry, homes semi-actively in on the target using the nose plane or canard control surfaces in a simple bang-bang mode.

Owing to the large degree of inherent dynamic stability, the glide vehicle does not require autostabilization. This avoids the currently unsolved problem of auto-pilot design capable of surviving gun launch. Also, the maneuverability of the glide vehicle far exceeds that of proposed rocket-assisted and sub-caliber weapons stabilized with small fins. Moreover, the glide vehicle can fly further with increased payload.

A comparison of the glide vehicle of the present invention with prior art devices illustrates the improved range performance: the standard service projectile has a maximum range of only 25 miles and carries 20 pounds of high explosives; the fin-stabilized ballistic RAP (rocket-assisted projectile) flies 60 miles with 25 pounds of high explosives; the glide vehicle design of the present invention has a maximum range capability of 135 miles and carries 50 pounds of high explosives. However, if it is assumed that radar track and horizon scanning cannot be used below the 20,000 foot altitude, the maximum range, except possibly for general shore bombardment purposes, is about 100 miles. Maximum range occurs at a cruise angle of attack of 3.3°.

OBJECTS OF THE INVENTION

An object of the present invention is the provision of a gun-launched glide vehicle having improved maneuverability, increased range performance and accuracy.

Another object is to provide a vehicle which has a high lift-to-drag ratio (L/D) and is statically stable possessing maximum inherent dynamic stability.

Other objects, advantages and novel features of the invention will become apparent from the following detailed description of the invention when considered in conjunction with the accompanying drawings.

BRIEF DESCRIPTION OF THE DRAWINGS

FIG. 5 is a diagrammatic illustration of the bang-bang monoplane or nose plane control during terminal flight.

DETAILED DESCRIPTION OF THE PREFERRED EMBODIMENT

Figure 1:
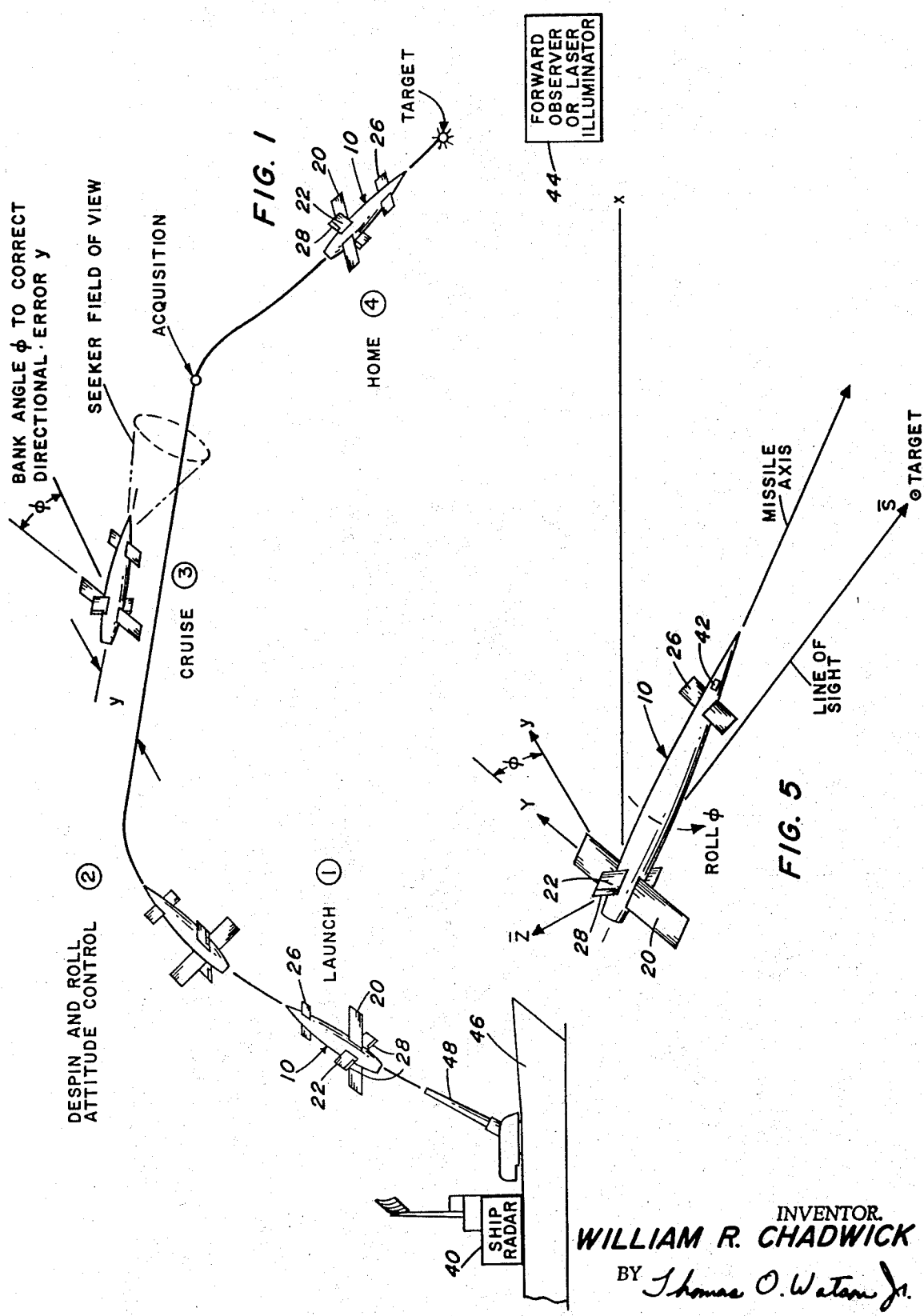
FIG. 1 is a diagrammatic view of the preferred embodiment of the present invention depicting the different phases from launch to target engagement.

FIG. 1, which illustrates the preferred embodiment of the weapons system, depicts the four different phases during flight, which will now be briefly summarized. A ship 46, having an 8-inch gun 48 mounted thereon, launches the glide vehicle or missile 10. During the pre-vertex phase, despin and roll-attitude stabilization occurs. The cruise phase commences at the vertex and during this third phase the directional motion of the vehicle is controlled by banking. The fourth phase begins with acquisition by the glide vehicle 10 of laser energy reflected from the target. The glide vehicle, during this last phase, homes in for target engagement.

Figure 2:
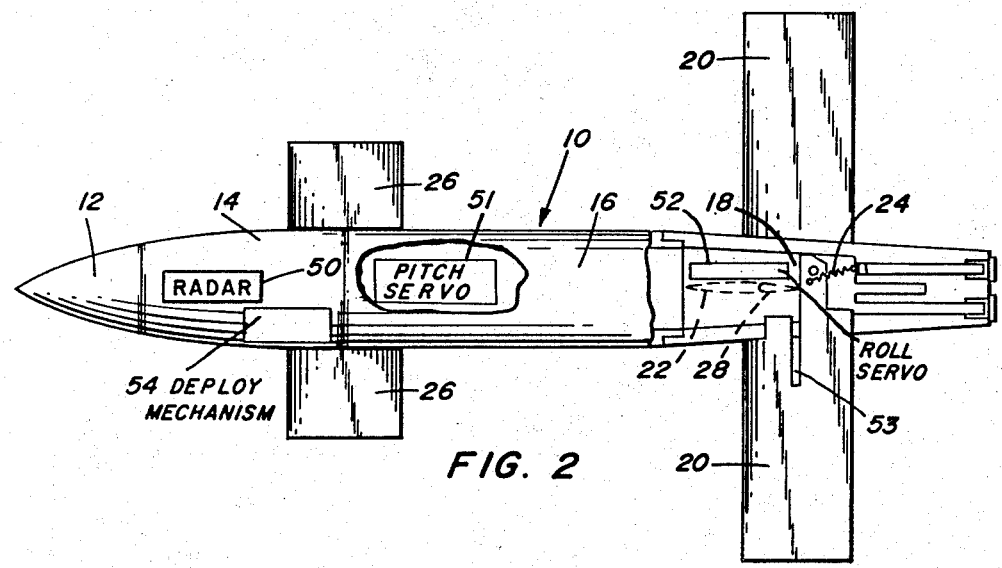
FIG. 2 illustrates a side elevation of the glide vehicle of the present invention.

The salient configurational details of the missile or glide vehicle 10 are shown in FIG. 2. The missile 10 is 8 inches in diameter and 70 inches long and can be fired from existing 8-inch guns subject to some modification. Since the glide vehicle 10 is twice as long as the standard 8-inch service projectile, it could, for example, be fabricated in two sections for pre-launch assembly in the gun tube. The glide vehicle 10 includes a head portion 12 which contains the seeker optics; a second portion 14 which includes the horizon scanner, electronic equipment, the pitch servo 51 and the deploying mechanism 54; a third portion 16 contains the warhead; and a fourth portion 18 which includes the power supply, the roll servo 52 and the deploy mechanism 24.

The object of maximum inherent dynamic stability may be achieved by disposing the wings and controls surfaces as far from the missile center of gravity as possible. Accordingly, the canard configuration shown in FIG. 2 was selected in preference to the conventional mid-wing design where the main lifting surfaces contribute very little to dynamic stability. The wings 20 and vertical stabilizers 22, which are mounted as shown in FIG. 2, rotate backward and overlap for internal stowage in the gun tube 48 and are retracted conveniently inside the missile body. Vertical stabilizers 22 rotate backward and pass through slots 53 in the wings which are in alignment when the wings are folded back. As the missile 10 leaves the gun, surfaces 20 and 22 are deployed automatically, for stability during ascent, using, for example, close-coiled helical compression springs of deploy mechanism 24. A monoplane control surface or nose plane 26 is deployed 50 seconds after launch by deploy mechanism 54, just before maximum altitude, and telescopes outwardly, as seen in FIG. 1.

Figure 3:
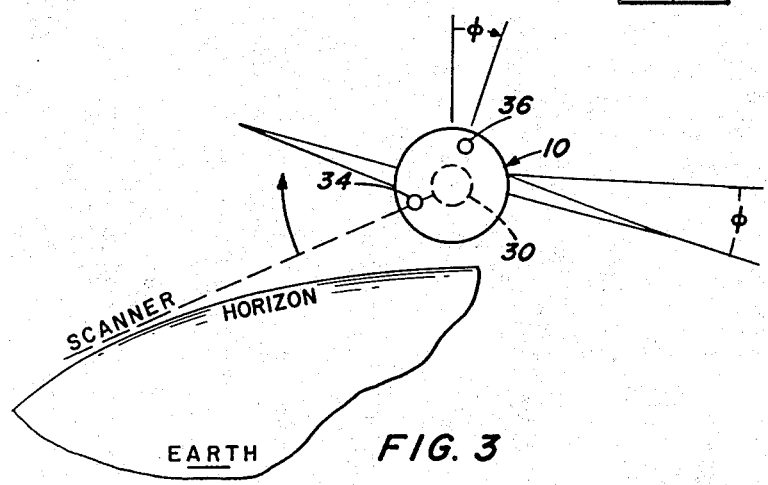
FIG. 3 diagrammatically illustrates the operation of the infrared horizon scanner which is mounted in the glide vehicle.
Figure 4:
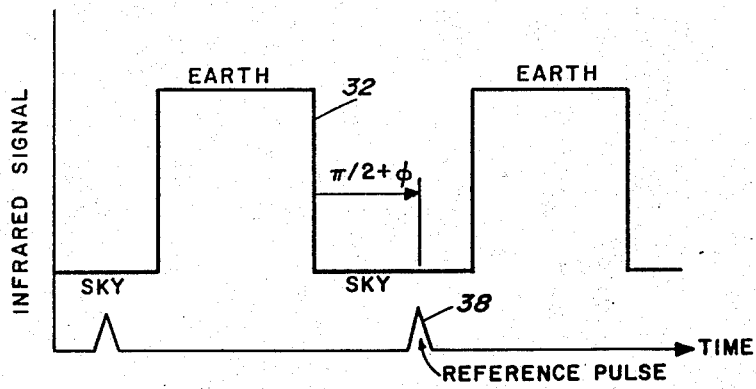
FIG. 4 illustrates the signals produced by the infrared horizon scanner of the present invention.

Vehicle despin and roll-attitude stabilization are achieved during the second phase, using the infrared horizon scanner in portion 14 for accurate roll-attitude sensing and small bang-bang servo-operated roll-tabs 28 located along the trailing edges of the vertical stabilizers 22. Referring to FIG. 3, a lateral infrared telescope or scanner 30, rotating at a constant rate of 100 c/s, senses the temperature difference between the earth and the sky, producing a rectangular output signal 32 (see FIG. 4). Once per scan cycle, an iron slug 34 rotating with the scanner 30 and fixed in the armature of the scan motor, coincides with a magnetic pickup 36 fixed in the missile 10, producing a periodic reference pulse 38. The phase difference between the earth-sky interface and the reference pulse 38 is then a direct measure of the roll angle. Any deviation from zero roll produces a positive or negative error signal that is transmitted to the roll servo in portion 18 which deflects the roll-tabs 28 in the proper sense to return the vehicle to the desired attitude. The rate at which despin may be achieved, without recourse to rate-feedback, depends upon the open-loop roll damping derivative. The glide vehicle 10 possesses a large roll damping derivative.

During the cruise phase, mid-course directional control is achieved by banking the missile 10 in accordance with lateral position estimates from ship-based track radar 40. A radar beacon 50 is located in the vehicle 10 and lateral position is measured every 10 seconds. Should lateral drift exceed specified limits the vehicle 10 would be commanded to execute a corrective maneuver by the deflection of roll-tabs 28. The roll or bank angle $\phi$ during this maneuver is, of course, selected to exceed any possible roll-bias error in the roll-control system. Roll stabilization in the banked turn is maintained in precisely the manner discussed above; in this case, however, a nominal roll angle is introduced by varying the phase difference between the earth-sky interface signal 32 and the reference pulse 38. Angular tracking accuracy of about 0.002 radians is considered reasonable for ship-based radar; this level of accuracy is considerably in excess of the level required for target acquisition.

Launch conditions (3,000 ft/sec muzzle velocity at 55° elevation angle) do not vary with target range because, with the aid of midcourse directional guidance, any target with range coordinates varying from 65 out to 100 miles is acquired automatically from the glide path.

The semi-active terminal homing phase commences after the glide vehicle's detector has acquired laser energy reflected from the target. A forward observer 44 illuminates the target with laser energy and the glide vehicle 10 acquires automatically infrared radiation reflected from the laser-illuminated target during the cruise phase. Once this occurs, the high degree of lateral maneuverability which the vehicle 10 possesses insures rapid convergence from the glide path to the terminal collision course. During homing the roll-tabs 28 are allowed to trail. FIG. 5 illustrates the basic simplicity of the guidance system: in three dimensions, an infrared seeker or detector 42, which is fixed in the head 12 of vehicle 10, determines whether the instantaneous line-of-sight intersects the infrared detection surface in the lateral YZ missile plane above or below the plane of the wings 20. The nose plane 26 would then be hard-over positive or hard-over negative. The detector 42 which receives the reflected radiation, generates a voltage in order to actuate pitch servo 51 and operate the nose plane 26 to correct for any difference between the line-of-sight and the missile axis. The nose plane 26 is operated in a bang-bang mode to home vehicle 10 in on the target.

In the present invention, the advantages of the seeker 42 with a large conical field of view and a large detection range are two-fold: first, the size of the target acquisition window may be increased, thus simplifying the mid-course guidance problem, and second, the target range coverage is increased. Furthermore, for a given conical field of view, the seeker 42 can cover more ground (at acceptable detection ranges) if the symmetry axis of the scan cone is tilted below the longitudinal axis of the vehicle 10 (see FIG. 1). Maximum target range is 500,000 feet or nearly one hundred miles. This occurs when acquisition takes place at the end of the glide path at a 20,000 foot altitude.

Minimum target range varies considerably with acquisition range and any target from 65 miles to 100 miles will be acquired automatically from the glide path.

Following target acquisition, the vehicle 10 is allowed to acquire the roll velocity by trailing the roll-tabs 28. The fixed seeker 42 then determines, at a sampling rate equal to the pulse repetition frequency of the laser illuminator 44, whether the line-of-sight intersects the infrared detection surface above or below the plane of the wings 20. This is determined by using the scalar product $\bar{s} \cdot \bar{z}$ as indicated in FIG. 5.

The object of maximum L/D is achieved when the drag due to lift equals the zero yaw drag. It should also be mentioned here that for internal stowage, the cord length of each lifting surface was limited to one body diameter.

Finally, an indication of the approximate weight breakdown for the 250 pound glide vehicle 10 will be given: the high-strength, thin-walled case, 140 pounds; the optics, horizon scanner and electronics, 15 pounds; the wings, vertical stabilizers and nose-plane, 25 pounds; the power supply and servos, 20 pounds; and the high-explosives, 50 pounds.

A typical flight path will be summarized corresponding to a target range of 436,000 feet. The total flight time is about 7 minutes. The glide vehicle 10 decelerates continuously during the cruise phase from Mach number $M = 1.1$ down to $M = 0.8$ with a terminal Mach number rise to $M = 1.0$ at impact. The average glide angle is about 5° and the terminal dive angle is about 30°.

Obviously, many modifications and variations of the present invention are possible in light of the above teachings. For example, the level of miss-distance performance of the glide vehicle 10 could be improved considerably by increasing the nose-plane 26 incidence limits (lateral maneuverability) close to impact and by filtering the guidance signal.

What is claimed is:

1. A gun-launched glide vehicle having a head portion, a rear portion and a center axis comprising the combination of:
    a gun-launched missile having retractable aerodynamic lifting surfaces mounted thereon;
    retractable vertical stabilizers mounted on said missile at substantially right angles with respect to said lifting surfaces;
    roll-tabs located along the trailing edges of said vertical stabilizers;
    a retractable nose plane mounted adjacent the head portion of said vehicle ahead of said lifting surfaces and said stabilizers;
    first actuating means for continuously and fixedly deploying said lifting surfaces and vertical stabilizers during flight;
    second actuating means for deploying said nose plane during flight;
    servo means to move said roll-tabs and said nose plane;
    radar means mounted in said missile for receiving directions and generating signals to actuate said roll-tabs in response to said directions;
    control means for generating signals to actuate said servo means to control said roll-tabs to control missile despin and roll-altitude mounted in said missile; and
    target acquiring means to locate a target and generate signals to actuate said servo means to move said nose plane to control the pitch of the vehicle.

2. The glide vehicle of claim 1 wherein said retractable aerodynamic lifting surfaces are wings mounted on pins within said missile and rotate rewardly for storage during launching.

3. The glide vehicle of claim 2 wherein said first actuating means comprises at least one close-coiled helical compression spring.

4. The glide vehicle of claim 1 wherein said control means includes a rotating horizon scanner means to measure the roll angle and produce a signal which actuates the servo means to move said roll-tabs.

5. The glide vehicle of claim 1 wherein said lifting surfaces each have a slot and are mounted in parallel on the glide vehicle and are offset from and parallel to a first line passing through the center axis of the vehicle and said vertical stabilizers are mounted in parallel on the glide vehicle and are offset from and parallel to a second line perpendicular to said first line and passing through the center axis of said glide vehicle.

6. A glide vehicle for use in a gun as a long range projectile comprising:
    a vehicle body having a central axis;
    two lifting surfaces, two vertical stabilizers and two pitch control surfaces mounted on said body in a first retracted position when said projectile is in said gun and in a second deployed position after said projectile clears said gun;
    roll-tabs mounted on the trailing edges of said vertical stabilizers;
    first actuating means for continuously biasing said lifting surfaces and vertical stabilizers into said second deployed position;
    second actuating means for continuously biasing said pitch control surfaces into said second deployed position;
    servo means to move said roll-tabs and said pitch control surfaces;
    control means mounted in said projectile for generating signals to actuate said servo means to control said roll tabs to control missile despin and roll-altitude; and
    target acquiring means to locate a target and generate signals to actuate said servo means to move said nose plane to control the pitch of the vehicle.

7. The glide vehicle of claim 6 wherein the width of each lifting surface and vertical stabilizer is greater than one half the maximum width of the projectile, each lifting surface has a slot therein, the lifting surfaces overlap in their first retracted position and the slots align in said first retracted position; and the vertical stabilizers overlap in said first retracted position and pass through said slots.

8. The glide vehicle of claim 7 wherein the length of each pitch control surface is greater than one half the maximum width of the projectile; and the control surfaces overlap in the first retracted position and said second actuating means telescopically deploys said pitch control surfaces into said second deployed position.

9. The glide vehicle of claim 7 wherein the length of each lifting surface is greater than one half the maximum width of the vehicle; and the lifting surfaces and vertical stabilizers are mounted on pivot means which allow rotation from their first retracted position into their second deployed position.

* * * * *